(12) United States Patent
Venguerov (10) Patent No.: US 7,412,452 B2
(45) Date of Patent: Aug. 12, 2008

(54) DATA STORAGE AND RETRIEVAL SYSTEM WITH INTENSIONAL CATEGORY REPRESENTATIONS TO PROVIDE DYNAMIC CATEGORIZATION OF INFORMATION ITEMS

(75) Inventor: Mark Venguerov, Dun Laoghaire (IE)

(73) Assignee: PI Corporation, Kirkland, WA (US)

( * ) Notice: Subject to any disclaimer, the term of this patent is extended or adjusted under 35 U.S.C. 154(b) by 385 days.

(21) Appl. No.: 11/039,191

(22) Filed: Jan. 20, 2005

(65) Prior Publication Data

US 2006/0161529 A1 Jul. 20, 2006

(51) Int. Cl.
*G06F 17/30* (2006.01)
(52) U.S. Cl. .......................................... 707/100; 707/3
(58) Field of Classification Search ..................... 707/3, 707/100
See application file for complete search history.

(56) References Cited

U.S. PATENT DOCUMENTS

| | | | | |
|---|---|---|---|---|
| 5,717,925 A | * | 2/1998 | Harper et al. ................ | 707/102 |
| 5,819,258 A | * | 10/1998 | Vaithyanathan et al. ......... | 707/2 |
| 5,862,325 A | * | 1/1999 | Reed et al. .................. | 709/201 |
| 5,878,423 A | * | 3/1999 | Anderson et al. ............ | 707/100 |
| 5,920,864 A | * | 7/1999 | Zhao ........................... | 707/10 |
| 5,943,670 A | * | 8/1999 | Prager .......................... | 707/5 |
| 6,055,540 A | * | 4/2000 | Snow et al. .............. | 707/103 R |
| 6,272,495 B1 | * | 8/2001 | Hetherington ............... | 707/101 |
| 6,385,602 B1 | * | 5/2002 | Tso et al. ........................ | 707/3 |
| 2002/0107840 A1 | * | 8/2002 | Rishe ............................. | 707/3 |
| 2005/0044089 A1 | * | 2/2005 | Wu et al. ..................... | 707/100 |

* cited by examiner

Primary Examiner—Hosain T Alam
Assistant Examiner—Syling Yen
(74) Attorney, Agent, or Firm—David A. Dagg (57) ABSTRACT

A system and method for applying intensional category representations to provide dynamic categorization of information items in a data storage and retrieval system is disclosed. The disclosed system may apply pattern recognition techniques during information storage and retrieval to provide dynamic categorization of information items. Information items are categorized as they are observed. Information items may each be associated with one or more categories. An information item may become a member of a category either initially, when it is created, or subsequently by dynamic acquisition of certain properties. Category membership may be further be acquired or lost when property values are changed, and/or as a result of changes to properties or property values of referenced or referring information items. The disclosed information storage and retrieval system operates to categorize objects as they evolve over time. Properties may be added to information items, thus changing the structure of the information item, with the result that new functionality is dynamically associated with the information items.

40 Claims, 2 Drawing Sheets

DATA STORAGE AND RETRIEVAL SYSTEM WITH INTENSIONAL CATEGORY REPRESENTATIONS TO PROVIDE DYNAMIC CATEGORIZATION OF INFORMATION ITEMS

FIELD OF THE INVENTION

The present invention relates generally to the field of information storage and retrieval, and more specifically to an information storage and retrieval system having intensional category representations to provide dynamic categorization of information items.

BACKGROUND OF THE INVENTION

Many types of software systems have been developed for storing and retrieving data. Relational databases are one type of solution that performs well in the specialized use areas they are designed for. However, relational databases are not applicable to all problems. It is generally understood that the performance of relational databases suffers when they are used to provide run-time flexibility in the information categories (i.e. tables) being stored.

In the area of non-relational systems, some systems are referred to as "semi-structured", in that they involve the storage and retrieval of "semi-structured" information, such as XML (extensible Markup Language) documents. For example, non-relational systems may be more suitable than relational systems for the storage, management, retrieval, and exchange of personal information, and/or information relating to information workers.

Moreover, areas that have traditionally been approached using non-relational systems may not actually be cleanly reducible to a set of documents. Accordingly, existing "semi-structured" approaches may be inadequate for a category of data storage and retrieval applications. This category includes the storage and retrieval of personal information, and is characterized by high variability of the structure of the stored information. For example, a user of a personal information database may wish to store information regarding multiple personal contacts. However, when various communication modes are considered, the contact information stored for each contact is highly variable from contact to contact, and potentially also over time. Moreover, the functional context for each contact is also highly variable, since each piece of stored contact information for a given contact may or may not be relevant to a specific communication application. While existing systems using an XML-based approach have fared better than relational databases with regard to this problem, the information being represented is really not hierarchical, and imposing a hierarchy is the defining feature of the XML approach.

Additionally, if it is desirable to share parts of documents in a document based system, there arises the problem of maintaining different document versions, and the resulting dependencies become too complex for a system in which the documents are totally independent. File systems also suffer from the same problem, since they are based on an independent container model.

For the above reasons and others, it would be desirable to have a new system for information storage and retrieval that is applicable to problems not amenable to solution using relational databases, or using existing non-relational systems, such as existing semi-structured document-based systems, and necessarily having highly variable information structure. The new system should be applicable to storage, management, retrieval and exchange of various specific kinds of information, including personal information and/or information relating to information workers.

SUMMARY OF THE INVENTION

To address the above described and other shortcomings of previous systems, a system and method for applying intensional category representations to provide dynamic categorization of information items in a data storage and retrieval system is disclosed. The dynamic categorization of information items provided by the disclosed system is performed automatically, independently with respect to information item creation or modification, and responsive to dynamic category creation or modification. Information items may be categorized as they are observed by the disclosed system, either in response to receipt of a query, or independent of query receipt. The disclosed system may apply pattern recognition or other appropriate techniques to information items during information storage and retrieval to provide dynamic categorization of the information items.

Each information item in the disclosed system may be categorized such that it is associated with one or more categories. An information item may become a member of one or more categories as a result of its initial properties at its creation, though the categorization itself may be delayed to a point in time subsequent to creation of the information item. The categorization of an information item may further reflect properties acquired subsequent to its creation. The disclosed information storage and retrieval system classifies information items as they evolve over time, as categories are also dynamically added and/or modified over time. As a result of the disclosed categorization that detects the addition or removal of properties in the information items over time, functionality associated with those properties can be dynamically applied to the information items. Moreover, since the categories may also be added and/or modified over time, the disclosed system can dynamically vary the functionality associated with certain properties and applied to the information items.

The disclosed system advantageously provides a model for data storage and retrieval which is at least as flexible as previous XML document-based, semi-structured information representation approaches, and provides sufficiently high performance in terms of data and knowledge retrieval time to meet various specific application requirements.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENTS

Figure 1:
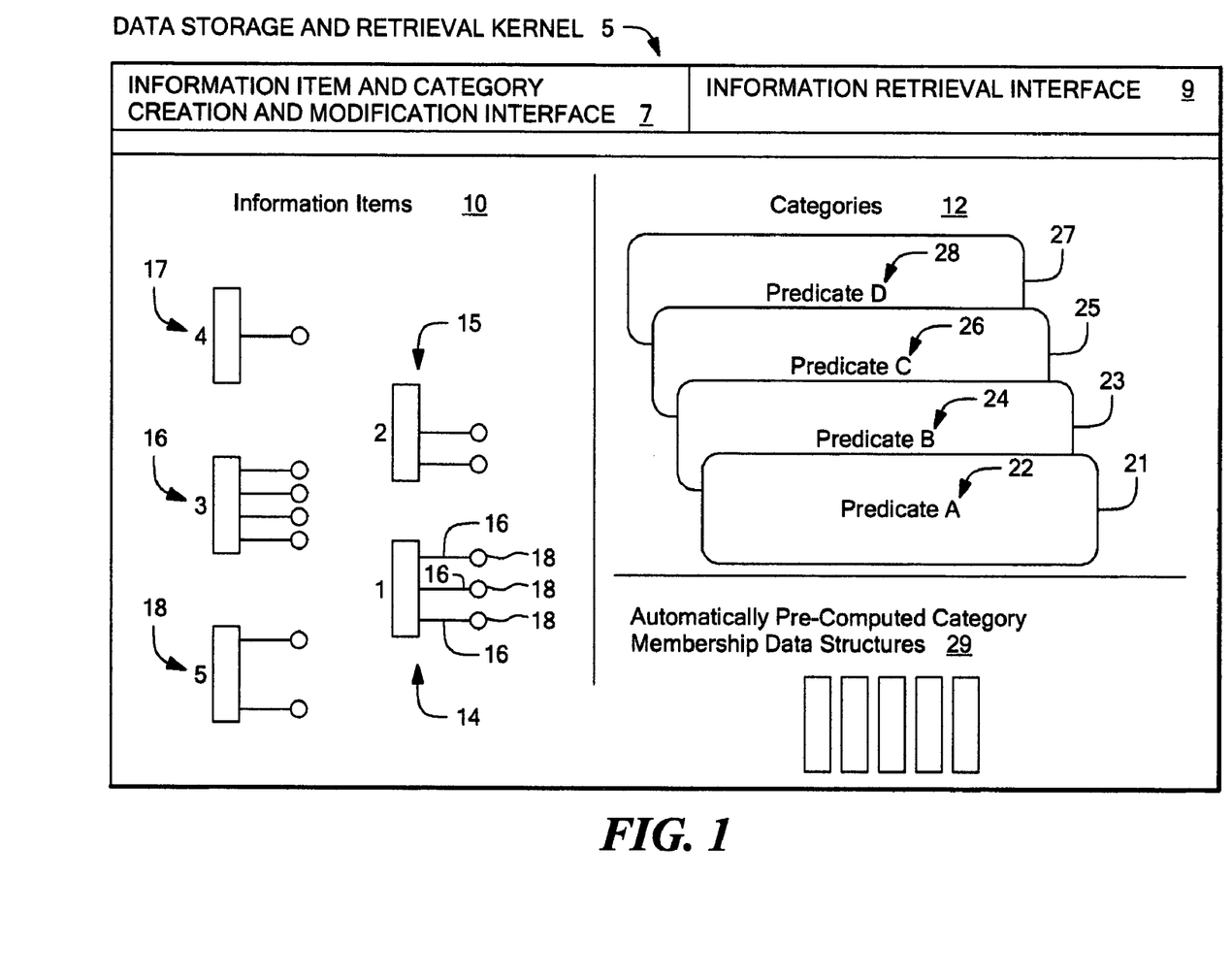
FIG. 1 is a block diagram illustrating components of an embodiment of the disclosed intensional categorization system for information management.

As shown in FIG. 1, components in an illustrative embodiment of the disclosed system in a data storage and retrieval kernel 5 include an information item and category creation and modification interface 7, an information retrieval interface 9, a number of Information Items 10, and a number of Categories 12. The Information Items 10 and Categories 12 are stored separately, in that they are logically independent, and the Categories 12 maintain no references (e.g. pointers) to or identifications (e.g. names) of the items they include. Advantageously, the structures of the information items within the Information Items 10 may be highly variable. First, different ones of the Information Items 10 may include different numbers of properties having associated values. Thus the Information Items 10 may each have different numbers of properties. Additionally, the number of properties for a given one of the Information Items 10 may change over time. For purposes of illustration, the Information Item 14 is shown including Properties 16, each having a corresponding one of the Values 18. Values of the properties for the Information Items 10 may also change dynamically.

The Information Items 10 may include any specific types of information. In one embodiment, the Information Items 10 include personal information maintained by individuals themselves during and/or for their general, daily, and/or professional activities, and the properties of each of the Information Items 10 may accordingly include corresponding personal information properties. Such personal information properties may, for example, include various types of contact information, such as postal addresses, electronic mail addresses, telephone numbers, persons' names, and any other type of contact information. Personal information properties may further include information regarding personal activities, to do lists, schedule information including appointment dates and times, and any other type of personal information. The preceding examples of personal information properties are given only for purposes of explanation, and the disclosed system is not so limited. Accordingly, the disclosed system may be implemented in embodiments using any other specific type of personal information, or any other non-personal information.

Each of the categories 12 includes or is associated with a predicate, which may be embodied as a software routine or software routine with a Boolean result. The predicate for a category provides a test for an information item to which the predicate is applied. If an information item passes the test defined by the predicate of a category, then the information item is considered to be contained within the category, and an association may be formed between the information item and the category. The disclosed system uses "intensional" category assignment, in that each category includes a predicate which, applied to an information item, logically returns true or false with respect to whether the information item belongs in that category. This approach is distinct from previous "extensional" approaches, which rely on information item identities and categories that include the information item lists. In traditional relational databases, only extensional categorization has been supported, represented by the table membership of the records in the database. Such existing systems have not supported testing of the contents of a record to determine which table it belongs to.

General definitions for "intensional definition" may be found in various sources. In the area of logic, an intensional definition gives the meaning of a term by giving all the properties required for something to fall under that definition—the necessary and sufficient conditions for belonging to a set being defined. One example of an intensional definition of "bachelor" is "unmarried man." This is because being an unmarried man is an essential property of something referred to as a bachelor. Being an unmarried man is a necessary condition of being a bachelor—one cannot be a bachelor without being an unmarried man. Being an unmarried man is also a sufficient condition of being a bachelor—any unmarried man is a bachelor. The intensional definition approach is opposite to the extensional definition approach, which defines by listing everything falling under a definition. Accordingly, an extensional definition of "bachelor" would be a listing of all the unmarried men in the world. In this regard, intensional definitions are best used when something has a clearly-defined set of properties, and work well for sets that are too large to list in an extensional definition. Moreover, it is impossible to give an extensional definition for an infinite set, but an intensional one can often be stated concisely. For example, while the infinite number of even numbers makes them impossible to list, they can be defined intensionally by saying that even numbers are integer multiples of two.

The predicates used in the assignment process provided by the disclosed system advantageously provide intensional definitions for corresponding ones of the categories 12. Accordingly, each predicate of the disclosed system tests the properties of an information item to determine if that information item belongs to the category defined by the predicate. The intensional definition of categories in the disclosed system enables categorization of information items at run time, and accordingly allows information items to dynamically change their categorical membership. The disclosed system enables checking information items at any time to determine whether they have changed category membership. Each category must accordingly at least include a category name and a predicate which can be applied to an information item to determine if the information item belongs to the category.

In the embodiment of FIG. 1, each of the categories 12 has a corresponding predicate. Thus category 21 corresponds to Predicate A 22, category 23 corresponds to Predicate B 24, category 25 corresponds to Predicate C 26, and category 27 corresponds to Predicate D 28. While for purposes of concise illustration, only four example categories are shown in the categories 12 of FIG. 1, the disclosed system is not so limited, and may be embodied using any specific number of categories.

The predicates for the categories 12 may each be satisfied by a different set of the information items 10. If one of the information items 10 satisfies any one of the predicates for the categories 12, it may be considered as belonging to the corresponding category for any processing or handling that might be associated with that corresponding category at any point during the processing of that information item. Additionally, if one of the information items 10 satisfies a predicate for one of the categories 12, then that information item can be included when all the members of the category are enumerated or otherwise processed at any point.

The information item and category creation and modification interface 7 permits information items 10 to be created and/or modified dynamically, and independently permits categories 12 to be created dynamically. The interface 7 may be embodied to allow information item creation and/or modification operations to be performed directly or indirectly by a user, for example in an embodiment where the disclosed system stores personal information for that user. Such user controlled actions may, for example, be provided by through graphical user interface (GUI) or the like associated with or provided by the interface 7. The interface 7 may also or alternatively allow information item creation and/or modification by software programs and/or processes external to the data storage and retrieval kernel 5. Such actions may, for example, be provided through an application programming interface (API) or the like associated with or provided by the interface 7.

In a preferred embodiment, item modifications are provided in two different ways, depending on how categories are configured. Synchronous categories require that item modification operations are reflected immediately in the results of any subsequent information retrieval operations. In this way, a category can be configured such that when an item modification affecting the membership of that category returns a completion status, all subsequent queries will return results that completely reflect that modification. Asynchronous categories do not require immediate consistency with the modifications in subsequent information retrieval operations.

The information retrieval interface 9 permits retrieval of information items 10 dynamically and independently from the categorization of the information items 10 based on the categories 12. The interface 9 may be embodied to allow information item retrieval to be performed directly or indirectly by a user, for example in an embodiment where the disclosed system stores personal information for that user. Such user controlled actions may, for example, be provided by through graphical user interface (GUI) or the like associated with or provided by the interface 9. Information item retrieval through the interface 9 is accomplished in a preferred embodiment based on input information retrieval queries including one or more category names associated with corresponding ones of the categories 12. The information items returned in response to such queries reflect the categorization of information items 10 based on the ones of categories 10 indicated by the category names contained in such queries. The interface 9 may be embodied such that any specific query language, including by not limited to SQL (Structured Query Language) or the like, may be used to indicate the information items to be retrieved. The interface 9 may also or alternatively allow information item retrieval by software programs and/or processes external to the data storage and retrieval kernel 5. Such actions may, for example, be provided through an application programming interface (API) or the like associated with or provided by the interface 7.

Automatically pre-computed category membership data structures 29 may be used to support the information item retrieval interface 9 in order to provide better response times for queries, including those queries that may use category definitions as part of the query. The data structures 29 may be created or modified automatically, synchronously or asynchronously, in response to the items or categories being created or modified via the information and category creation and modification interface 7.

Any application may operate using or based on the dynamic categorizations provided by the disclosed system. For example, in one embodiment, a search application or tool may operate to perform searches and apply rankings of the search results based on categorizations of information items provided by the disclosed system. In such an embodiment the search tool might respond to a search query by searching only for information items belonging to some combination of categories 12.

Any specific intensional definition can be used in the predicates for the categories of the disclosed system. For example, a predicate may test an information item for the existence in an information item of all properties in a set of one or more properties. Or, a predicate may test an information item for the presence of at least one property within a set of properties. Another type of predicate may test the cardinality of certain properties. Such a predicate may test whether an information has a specific property, and whether the information item has some predetermined number of values for that property. If the information item does not have the predetermined number of values for the property, then such a predicate is not satisfied.

The disclosed system may further include value-based predicates, which test for certain property values. Value-based predicates may test any specific property for any specific value. For example, these predicates may test whether a Boolean property has a true or a false value, whether a zip code property has a certain zip code value, whether a price property has a value between a minimum and a maximum price, whether a date property is between a starting date and an ending date, etc.

Another type of predicate that may be used in an embodiment of the disclosed system tests one or more referential properties of an information item. These predicates test whether a value of a property is a reference (e.g. pointer) to another information item belonging to a specified category or set of categories.

The above described predicate examples are given for purposes of explanation only, and those skilled in the art will recognize that the disclosed system is not limited to those specific types of predicates, and that other types of predicates may readily be used in the alternative or additionally.

The intensional category definitions of the disclosed system may associate various combinations of information items into categories. For example, with reference to FIG. 1, Category 21 has Predicate A 22, which may be satisfied by Information Item 1 14 and Information Item 2 15. Category 23 has Predicate B 24, which may be satisfied by Information Item 1 14, Information Item 4 17, and Information Item 5 18. Category 25 is shown having Predicate 26, which may be satisfied by none of the Information Items 10, and Category 27 has Predicate 28, which may be satisfied by all of the Information Items 10. Over time, the specific ones of Information Items 10 that satisfy specific ones of the predicates for the Categories 12 may change as the properties of the Information Items 10 change.

The previous examples are given for purposes of explanation only, in order to illustrate the categorization process of the disclosed system. Accordingly, predicates within an embodiment of the disclosed system may operate to categorize information items across specific categories in various specific combinations.

Figure 2:
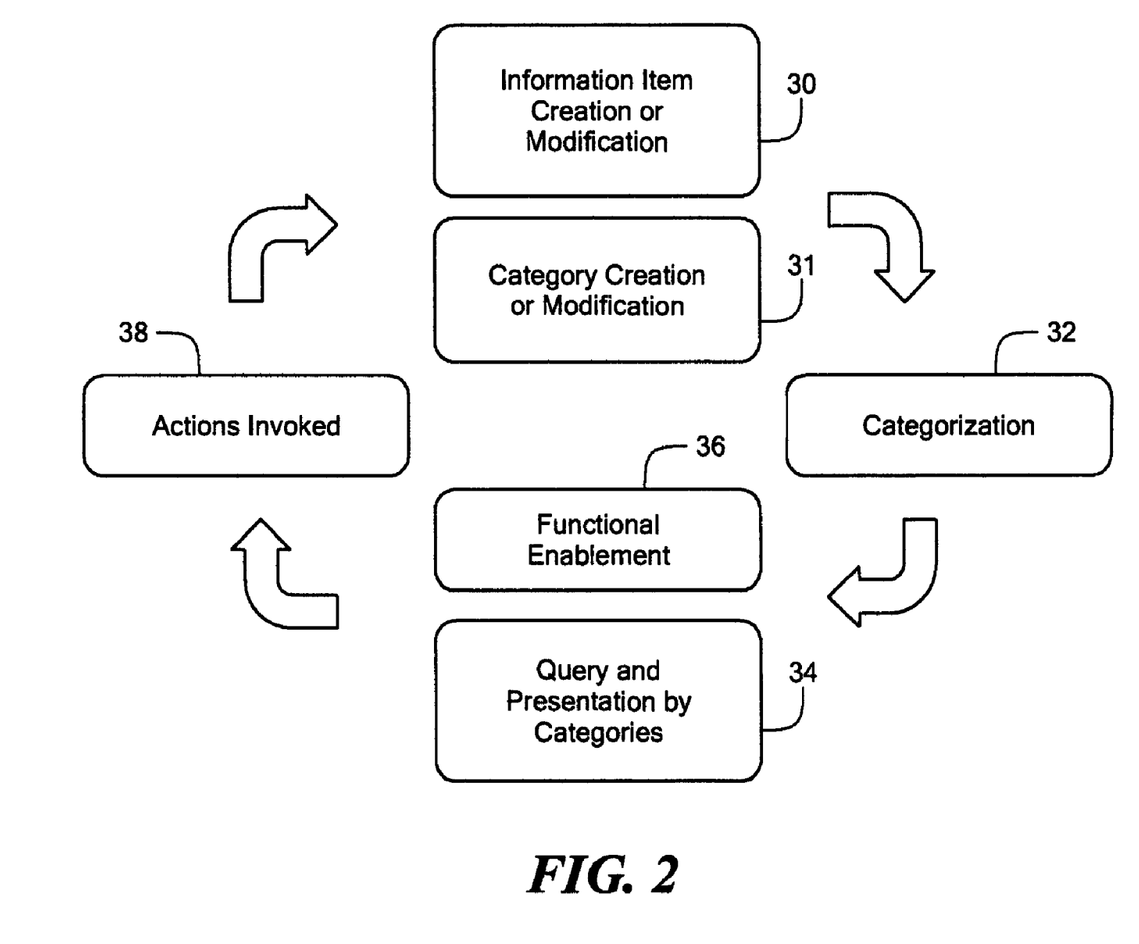
FIG. 2 is a flow chart illustrating operation of an embodiment of the disclosed intensional categorization system for information management.

As shown in FIG. 2, information items may pass through a series of steps or actions 30, 31, 32, 34, 36, and/or 38. At step 30, the information items are either created, or subsequently modified. Information items may, for example, be created by being manually inserted by a user through a user interface, or by being automatically inserted as a result of information received over network. At step 31, categories are either created, or subsequently modified. Categories may, for example, be created or modified as a result of installation of an application program, activities performed during execution of an application program, user activities, and/or other events. By providing for on-going introduction of new and modification of existing categories, the disclosed system allows for dynamic participation of newly created, modified, or previously existing information items in one or more new or modified categories. A categorization step 32 then applies the predicate or predicates associated with one or more categories to the information items, in order to assign each information item to one or more categories. Step 32 may, for example, be performed at the same time as creation/modification, or at any subsequent point in time. The categorization of an information item may reflect the run time addition of or modification to one or more properties of the information item (in step 30 for example), and/or the run time addition of or modification to one or more categories (in step 31 for example), independent of the categorization step 32. Advantageously, the categorization step 32 may be performed automatically, independent and asynchronous with respect to the creation and/or modification of the information items, and/or with respect to the creation and/or modification of categories, allowing significant performance optimizations.

The assignment of items to one or more categories may be embodied in various ways. For example, a number of automatically pre-computed category membership data structures may be created or modified at step 32. These data structures may be used subsequently for efficiently identifying items to be retrieved that satisfy queries expressed at least in part using the category definitions.

At step 34, the automatically computed data structures from step 32 may be used to support user operations or information rendering, such as category specific processing of user queries or requests, and/or category specific presentation of information items to the user based on category. For example, a user can request a retrieval and display of all information items relating to one or more categories that was applied at step 32. Additionally, the categorization at step 32 may enable a user to conveniently request and obtain a display of all information items related to a category for a specific work project, one or more application programs, or any other relevant category.

The categories associated with the information items at step 32 may also or alternatively be used to facilitate application of certain functionality to the information items at step 36, independent from and transparent to the user. In one example, where a category is used to identify those information items associated with an electronic mail ("email") application, the presence of an indication of a destination email address property within the information item may satisfy the associated predicate. Satisfaction of such a predicate may be based on a pattern matching function that tests the information item for the existence of any specific property denoting a destination email address. If such a property exists on the information item, the category forms an association between the information item and the email application, or provides an indication that the information item is associated with the email application. Accordingly, based on the categorization provided at step 32, possibly in response to detection of a destination email address property or the like as a property in an information item, functionality provided at step 36 may responsively present a SEND button display object to the user within a graphical user interface while the user is viewing that information item. Or, in the case where the SEND button display object had previously been grayed out, the disclosed system may operate to un-gray the button in response to the categorization at step 32 when the user is viewing such an information item. Thus an information item initially created as a text processing document, which has subsequently had attached to it a destination email address property or the like, may be automatically categorized as an email document, and based on that categorization can be subsequently treated by other applications as an email message. Those skilled in the art will recognize that various other specific function may be provided at step 36 in response to the specific categorization performed at step 32 for an information item.

Properties or values of the information items, such as the above described destination email address property, may be added to, modified, or removed from information items during information modification at step 30, and/or in response to various user actions performed at step 38. Thus the disclosed system provides an application independent information item categorization step at step 32. The item categorization at step 32 operates using intensional category predicates independent from any subsequent use of the categories associated with the information items, and also independent from the step of modifying the information items. As an information item is recognized as a member of a new category, the overall system gains any resulting advantages that come with being able to treat the item as a member of the new category. Such benefits of newly determined category membership may make the information item more useful, or more easily accessible for certain purposes. Certain categories might be more significant for certain applications, and may result in a reduction in the amount of work in terms of how the information item is retrieved.

The disclosed system provides significant advantages over traditional systems, in which categories are established at information item creation time, and maintained throughout the information item's lifetime. It allows improved flexibility in the structure in which items are represented during their lifetimes, as they acquire new properties or change existing ones without needing to be recreated.

FIGS. 1-2 are block diagram and flowchart illustrations of methods, apparatus(s) and computer program products according to an embodiment of the invention. It will be understood that each block of FIGS. 1-2, and combinations of these blocks, can be implemented by computer program instructions. These computer program instructions may be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using wireless, baseband signaling or broadband signaling techniques, including carrier wave signaling techniques, such as over computer or telephone networks via a modem.

While the invention is described through the above exemplary embodiments, it will be understood by those of ordinary skill in the art that modification to and variation of the illustrated embodiments may be made without departing from the inventive concepts herein disclosed. Moreover, while the preferred embodiments are described in connection with various illustrative program command structures, one skilled in the art will recognize that they may be embodied using a variety of specific command structures. Accordingly, the invention should not be viewed as limited except by the scope and spirit of the appended claims.

I claim:

1. A data storage and retrieval system stored on a computer readable memory in a computer system having at least one processor, comprising:
   a plurality of information items, each of said information items including at least one property;
   a plurality of intensional category definitions operable to provide dynamic categorization of said plurality of information items, wherein each of said intensional information item category definitions includes a predicate, wherein said predicate is operable to identify an input one of said information items as a member of a category based on said at least one property in said input one of said information items, wherein said category definitions are stored separately from said information items, and wherein said category definitions maintain no references to any one of said information items;
   an information item and category interface operable to
      receive a new information item and dynamically add said information item to said plurality of information items, wherein said new information item is dynamically created independently from creating or modifying any of said plurality of intensional category definitions,
      receive a new intensional category definition and dynamically add said new intensional category definition to said plurality of intensional category definitions, wherein said new intensional category definition is created independent from and without creating or modifying any of said plurality of information items, and
      receive a modification to an existing one of said plurality of information items and dynamically modify said one of said plurality of information items, wherein said modification is performed independent from and without creating or modifying any of said plurality of intensional category definitions;
   categorization logic operable to categorize said plurality of information items using said intensional category definitions, including said new intensional category definition, to populate at least one pre-computed category membership data structure to support efficient processing of at least one query, independent from creating or modifying any of said plurality of information items, wherein said categorization of said plurality of information items using said intensional category definitions including said new intensional category definition results in at least one of said plurality of information items existing prior to creation of said new intentional category definition participating in a category defined by said new intensional category definition; and
   an information item retrieval graphical user interface operable to receive said at least one input query from a user, wherein said input query indicates a subset of said plurality of information items by identification of at least one of said intensional category definitions.

2. The system of claim 1, wherein said at least one pre-computed category membership data structure is used to process said at least one query.

3. The system of claim 1, wherein each of said information item categories is operable to apply its associated predicate to at least one of said information items responsive to said information item being created.

4. The system of claim 1, wherein each of said information item categories is operable to apply its associated predicate to at least one of said information items responsive to said information item being modified.

5. The system of claim 4, wherein said modification to said at least one existing information item comprises addition of a new property to said information item.

6. The system of claim 4, wherein said modification to said at least one existing information item comprises changing a value of a property of said information item.

7. The system of claim 1, wherein said predicate for at least one of said information item categories is operable to test an input information item for the existence of a predetermined property, and in the event that said input information item includes said predetermined property, generate an indication that said input information item is associated with said one of said information item categories.

8. The system of claim 1, wherein said information items comprise personal information.

9. The system of claim 8, wherein each of said information items comprise at least one personal information property.

10. The system of claim 8, wherein said personal information comprises contact information.

11. The system of claim 9, wherein said personal information property has a value comprising at least one postal address.

12. The system of claim 9, wherein said personal information property has a value comprising at least one telephone number.

13. The system of claim 9, wherein said personal information property has a value comprising at least one name of a person.

14. The system of claim 9, wherein said personal information property has a value comprising a description of a personal activity.

15. The system of claim 9, wherein said personal information property has a value comprising a description of an appointment.

16. The system of claim 9, wherein said personal information property has a value comprising at least one electronic mail address.

17. The system of claim 1, wherein at least one of said information item categories is configured as a synchronous category, such that all item modification operations to items associated with said synchronous one of said information item categories are reflected in the results of all information retrieval operations received subsequent to receipt said item modification operations and referring to said synchronous one of said information item categories.

18. The system of claim 1, wherein at least one of said information item categories is configured as an asynchronous category, such that item modification operations to items associated with said asynchronous one of said information item categories need not be reflected in the results of information retrieval operations received subsequent to receipt of said item modification operations and referring to said asynchronous one of said information item categories.

19. A method for providing a data storage and retrieval system, comprising:
   storing a plurality of information items, each of said information items including at least one property;
   storing a plurality of intensional category definitions operable to provide dynamic categorization of said plurality of information items, wherein each of said intensional information item category definitions includes a predicate, wherein said predicate is operable to identify an input one of said information items as a member of a category based on said at least one property in said input one of said information items, wherein said category definitions are stored separately from any one of said information items, and wherein said category definitions maintain no references to any one of said information items;

operating in response to an information item and category interface to receive a new information item and dynamically add said information item to said plurality of information items, wherein said new information is dynamically created independently from creating or modifying any of said plurality of intensional category definitions, receive a new intensional category definition, and dynamically add said new intensional category definition to said plurality of intensional category definitions, wherein said new intensional category definition is created independent from and without creating or modifying any of said plurality of information items, and receive a modification to an existing one of said plurality of information items and dynamically modify said one of said plurality of information items, wherein said modification is performed independent from and without creating or modifying any of said plurality of intensional category definitions;

categorizing said plurality of information items using said intensional category definitions, including said new intensional category definition, to populate at least one pre-computed category membership data structure to support efficient processing of at least one query, independent from creating or modifying any of said plurality of information items, wherein said categorizing said plurality of information items using said intensional category definitions including said new intensional category definition results in at least one of said plurality of information items existing prior to creation of said new intentional category definition participating in a category defined by said new intensional category definition; and operating in response to an information item retrieval interface to receive at least one input query, wherein said input query indicates a subset of said plurality of information items by identification of at least one of said intensional category definitions.

20. The method of claim 19, further comprising using said pre-computed category membership data structure to process said at least one query.

21. The method of claim 19, wherein each of said information item categories applies its associated predicate to at least one of said information items responsive to said information item being created.

22. The method of claim 19, wherein each of said information item categories is operable to apply its associated predicate to at least one of said information items responsive to said information item being modified.

23. The method of claim 22, wherein said modification to said at least one existing information item comprises addition of a new property to said information item.

24. The method of claim 22, wherein said modification to said at least one existing information item comprises changing a value of a property of said information item.

25. The method of claim 19, wherein said predicate for at least one of said information item categories is operable to test an input information item for the existence of a predetermined property, and in the event that said input information item includes said predetermined property, generate an indication that said input information item is associated with said one of said information item categories.

26. The method of claim 19, wherein said information items comprise personal information.

27. The method of claim 26, wherein each of said information items comprise at least one personal information property.

28. The method of claim 26, wherein said personal information comprises contact information.

29. The method of claim 27, wherein said personal information property has a value comprising at least one postal address.

30. The method of claim 27, wherein said personal information property has a value comprising at least one telephone number.

31. The method of claim 27, wherein said personal information property has a value comprising at least one name of a person.

32. The method of claim 27, wherein said personal information property has a value comprising a description of a personal activity.

33. The method of claim 27, wherein said personal information property has a value comprising a description of an appointment.

34. The method of claim 27, wherein said personal information property has a value comprising at least one electronic mail address.

35. The method of claim 19, further comprising:

configuring at least one of said information item categories as a synchronous category; and processing item modification operations to items associated with said synchronous one of said information item categories are reflected in the results of all information retrieval operations received subsequent to receipt said item modification operations and referring to said synchronous one of said information item categories.

36. The method of claim 19, further comprising:

configuring at least one of said information item categories as an asynchronous category; and processing item modification operations to items associated with said asynchronous one of said information item categories are not be reflected in the results of at least one information retrieval operation received subsequent to receipt of said item modification operations and referring to said asynchronous one of said information item categories.

37. A computer program product including a computer readable storage medium, said computer readable storage medium having a computer program executed by at least one processor for providing a data storage and retrieval system stored thereon, said computer program comprising:

program code for storing a plurality of information items, each of said information items including at least one property;

program code for storing a plurality of intensional category definitions operable to provide dynamic categorization of said plurality of information items, wherein each of said intensional information item category definitions includes a predicate, wherein said predicate is operable to identify an input one of said information items as a member of a category based on said at least one property in said input one of said information items, wherein said category definitions are stored separately from said information items, and wherein said category definitions maintain no references to any one of said information items;

program code for operating in response to an information item and category interface to receive a new information item and dynamically add said information item to said plurality of information items independently from creating or modifying any of said plurality of information items, receive a new intensional category definition and dynamically add said new intensional category definition to said plurality of intensional category definitions, wherein said new intensional category definition is created independent from and without creating or modifying any of said plurality of information items, and receive a modification to an existing one of said plurality of information items and dynamically modify said one of said plurality of information items, wherein said modification is performed independent from and without creating or modifying any of said intensional category definitions;

program code for categorizing said plurality of information items using said intensional category definitions, including said new intensional category definition, to populate at least one pre-computed category membership data structure to support efficient processing of at least one query, independent from creating or modifying any of said plurality of information items, wherein said categorizing said plurality of information items using said intensional category definitions including said new intensional category definition results in at least one of said plurality of information items existing prior to creation of said new intentional category definition participating in a category defined by said new intensional category definition; and program code for operating in response to an information item retrieval interface to receive at least one input query, wherein said input query indicates a subset of said plurality of information items by identification of at least one of said intensional category definitions.

38. A computer system having at least one processor and memory for storing program code executable on said at least one processor, said memory having stored thereon program code for data storage and retrieval, comprising:

means for storing a plurality of information items, each of said information items including at least one property;

means for storing a plurality of intensional category definitions operable to provide dynamic categorization of said plurality of information items, wherein each of said intensional information item category definitions includes a predicate, wherein said predicate is operable to identify an input one of said information items as a member of a category based on said at least one property in said input one of said information items, wherein said category definitions are stored separately from said information items, and wherein said category definitions maintain no references to any one of said information items;

means for operating in response to an information item and category interface to receive a new information item and dynamically add said information item to said plurality of information items, wherein said new information item is dynamically created independently from creating or modifying any of said plurality of intensional category definitions, receive a new intensional category definition and dynamically add said new intensional category definition to said plurality of intensional category definitions, wherein said new intensional category definition is created independent from and without creating or modifying any of said plurality of information items, and receive a modification to an existing one of said plurality of information items and dynamically modify said one of said plurality of information items, wherein said modification is performed independent from and without creating or modifying any of said plurality of intensional category definitions;

means for categorizing said plurality of information items using said intensional category definitions, including said new intensional category definition, to populate at least one pre-computed category membership data structure to support efficient processing of at least one query, independent from creating or modifying any of said plurality of information items, wherein said categorizing said plurality of information items using said intensional category definitions including said new intensional category definition results in at least one of said plurality of information items existing prior to creation of said new intentional category definition participating in a category defined by said new intensional category definition; and means for generating and operating in response to an information item retrieval graphical user interface to receive at least one input query from a user, wherein said input query indicates a subset of said plurality of information items by identification of at least one of said intensional category definitions.

39. A method for providing a data storage and retrieval system, comprising:

storing a plurality of information items, each of said information items including at least one property;

storing a plurality of intensional category definitions operable to provide dynamic categorization of said plurality of information items, wherein each of said intensional information item category definitions includes a predicate, wherein said predicate is operable to identify an input one of said information items as a member of a category based on said at least one property in said input one of said information items, wherein said category definitions are stored separately from any one of said information items, and wherein said category definitions maintain no references to any one of said information items;

operating in response to an information item and category interface to receive a new information item and dynamically add said information item to said plurality of information items, wherein said new information is dynamically created independently from creating or modifying any of said plurality of intensional category definitions, receive a new intensional category definition, and dynamically add said new intensional category definition to said plurality of intensional category definitions, wherein said new intensional category definition is created independent from and without creating or modifying any of said plurality of information items, and receive a modification to an existing one of said plurality of information items and dynamically modify said one of said plurality of information items, wherein said modification is dynamically performed independently from creating or modifying any of said plurality of intensional category definitions;

categorizing said plurality of information items using said intensional category definitions to populate at least one pre-computed category membership data structure to support efficient processing of at least one query, independent from creating or modifying any of said plurality of information items, wherein said categorizing said plurality of information items using said intensional category definitions including said new intensional category definition results in said new information item participating in at least one of said categories defined by said plurality of intensional category definitions; and operating in response to an information item retrieval interface to receive at least one input query, wherein said input query indicates a subset of said plurality of information items by identification of at least one of said intensional category definitions.

40. A method for providing a data storage and retrieval system, comprising:

storing a plurality of information items, each of said information items including at least one property;

storing a plurality of intensional category definitions operable to provide dynamic categorization of said plurality of information items, wherein each of said intensional information item category definitions includes a predicate, wherein said predicate is operable to identify an input one of said information items as a member of a category based on said at least one property in said input one of said information items, wherein said category definitions are stored separately from said information items, and wherein said category definitions maintain no references to any one of said information items;

operating in response to an information item and category interface to receive a new information item and dynamically add said information item to said plurality of information items, wherein said new information is dynamically created independently from creating or modifying any of said plurality of intensional category definitions, receive a new intensional category definition, and dynamically add said new intensional category definition to said plurality of intensional category definitions, wherein said new intensional category definition is created independent from and without creating or modifying any of said plurality of information items, and receive a modification to an existing one of said plurality of information items and dynamically modify said one of said plurality of information items, wherein said modification is performed independent from and without creating or modifying any of said plurality of intensional category definitions;

categorizing said plurality of information items using said intensional category definitions to populate at least one pre-computed category membership data structure to support efficient processing of at least one query, independent from creating or modifying any of said plurality of information items, wherein said categorizing said plurality of information items using said intensional category definitions including said new intensional category definition results in said modified information item participating in at least one of said categories defined by said plurality of intensional category definitions; and operating in response to an information item retrieval interface to receive at least one input query, wherein said input query indicates a subset of said plurality of information items by identification of at least one of said intensional category definitions.

* * * * *